INVENTORS.
Leroy J. Miller,
John B. Rust,
BY
ATTORNEY.

United States Patent Office

3,531,282
Patented Sept. 29, 1970

3,531,282
PHOTOPOLYMER POLYMERIZATION FIXATION
PROCESS AND PRODUCTS
Leroy J. Miller, Canoga Park, and John B. Rust, Los
Angeles, Calif., assignors to Hughes Aircraft Company,
Culver City, Calif., a corporation of Delaware
Filed Oct. 3, 1966, Ser. No. 583,650
Int. Cl. G03c 1/68, 5/24
U.S. Cl. 96—48                                    32 Claims

ABSTRACT OF THE DISCLOSURE

A method of fixing a photopolymerizable monomer system containing a photo-redox polymerization catalyst system by heating the catalyst system.

---

Figure 1:
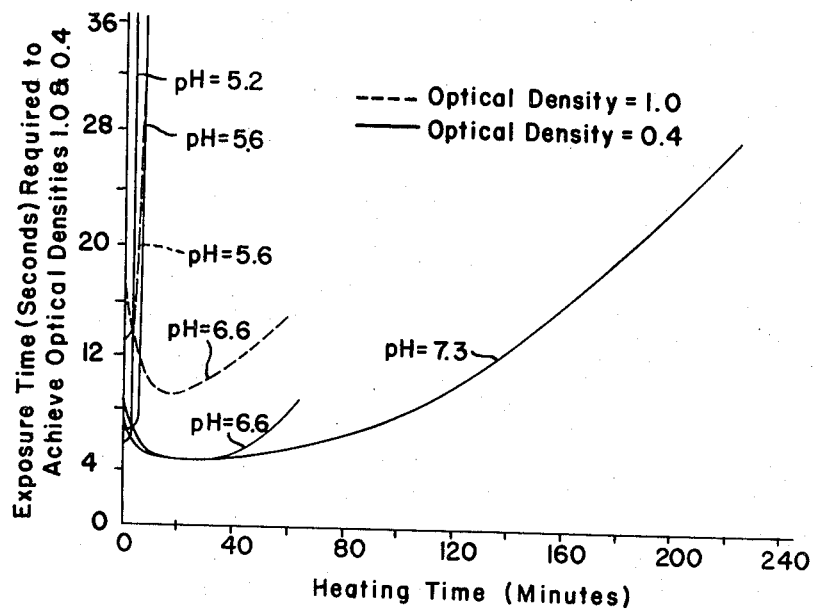

The present invention relates to a method of fixing or deactivating and desensitizing a catalyzed photopolymerizable composition, compositions therefor and the products thereof. More particularly, the invention relates to and is illustrated by a method and composition means for fixing a partially reacted photopolymer system, preferably employing a photo-redox or latent catalyst system, to prevent any further polymerization upon additional exposure to light, and more particularly for rapidly fixing such monomer-catalyst systems by critically controlling adjustment of the pH of the system in combination with heating to obtain a permanent record for retrieval and projection.

In the copending applications of John B. Rust "Photopolymers and the Process of Making Same," Ser. No. 450,397, filed Apr. 23, 1965, now abandoned, and Ser. No. 483,986, filed Aug. 31, 1965, now abandoned, and assigned to the instant assignee (hereafter referred to as "the copending applications"), there have been disclosed and described novel combinations of materials including polymerizable monomers, the monomers of which will polymerize under controlled application of radiation to the said combinations of materials. Such polymerization control is obtained by the use of novel photo-redox catalyst systems which include in combination: (1) an organic compound which is capable of efficiently absorbing radiant energy having a wavelength of between about 3800 A. to about 7200 A. and which, after absorption of radiant energy, attains an activated state corresponding to an oxidant or electron acceptor; and (2) a latent catalyst capable of initiating polymerization by reacting with the organic compound so that said catalyst forms a free radical by transfer of an electron to the organic compound upon activation of the organic compound by light in the wavelength range on the order of 3800 A. to 7200 A.

The use of the terms "polymerizable monomer" and "photo-redox catalyst system" herein and in the claims will refer to operable monomer and photo-redox catalyst systems as herein described and illustrated in the indicated copending applications. In addition, the phrases "light-sensitive photopolymer compositions" or "photosensitive compositions," as used herein, will refer specifically to one or more compositions comprising a mixture containing an unsaturated monomer material capable of being polymerized, as exemplified by a vinyl monomer, and a latent catalyst system inactive in the absence of light and activable by actinic radiation, as exemplified by a mixture comprising a radiant energy absorbing organic compound and a latent catalyst material which is likewise inactive in the dark and requires an exposure of said radiant energy absorbing organic compound to initiate polymerization of the unsaturated monomer material. Such latent catalyst systems, as exemplified herein, are preferably comprised of a dye material and an organic sulfinic compound or a triorgano-substituted phosphine compound, or mixtures of the same. The corresponding and relevant subject matter of the copending applications operably modified, as practiced herein, is incorporated by reference thereto.

In general, upon exposure of a medium containing a light-sensitive photopolymer composition, as disclosed herein and in the copending applications, to light received from an object, the light-sensitive photopolymer composition immediately commences to polymerize, in accordance with the radiation received, thereby producing a faithful image reproduction of the object. To prevent further polymerization, after the image has been formed to the desired density, the polymerizable monomer or the photo-redox catalyst within the light-sensitive photopolymer composition must be rapidly fixed, desensitized or inactivated. If this is not accomplished, the polymerizable monomer will continue to polymerize, particularly when further irradiated by light. Any continued polymerization will degrade the image by making the photopolymer image indistinguishable from the background. For these reasons, fixing of the light-sensitive polymerizable composition must occur after image formation to a desired density has been achieved, if the high quality image is to be permanently retained.

Fixing of the light-sensitive photopolymer compositions has been obtained by removal of the unpolymerized portion of the monomer therefrom, as by dissolution of the monomer with a solvent, rendering the polymerized image insensitive to light. Such extraneous "fixing" means, as heretofore known, do not lend to ultra-rapid processing and require additional manipulation, care and equipment for containment of the extraneous agent.

It would thus be of extremely great advantage to find a controllable method and means of fixing, inactivating or desensitizing the light-sensitive photopolymer compositions at any desired stage of polymerization in an extremely efficient and rapid manner—not by the physical removal of monomeric or catalytic material—but merely by the knowledgeable inclusion of certain types of compounds in the light-sensitive photopolymer composition. If such compounds could very rapidly render the unexposed, still light-sensitive material portion completely inactive or insensitive to further exposure of the photopolymer composition to visible light, very substantial advances in the art of image formation by photopolymerization would result. In adopting such an approach, the particular compounds chosen for inclusion in the light-sensitive photopolymer composition must not, of course, inhibit to any significant degree the free radical mechanism initiated by the photo-redox catalyst system under normal conditions under which photopolymerization proceeds.

Bearing in mind the foregoing, it is a major object of the present invention to provide a critical method of improving polymerization control and composition means therefor for rapidly and efficiently fixing, inactivating or desensitizing partially polymerized light-sensitive polymerizable monomer compositions employing a latent light-activated catalyst system by heating the composition.

It is a further object of this invention to provide a method and composition means for fixing, inactivating or desensitizing light-sensitive photopolymer compositions containing a photo-redox catalyst system comprising a photo-oxidant capable of absorbing a photon in the wavelength range of 3800 to 7200 A. and thereby being raised to an activated state and a catalyst capable of reacting with said activated state and being converted to an efficient polymerization-inducing free radical.

A particular object of this invention is to provide a process for fixing, inactivating or desensitizing light-sensitive partially polymerized photopolymer compositions containing a photo-redox catalyst system employing a light-activated photo-oxidant and a latent catalyst including an excess of pH lowering reagent material which critically conditions the photopolymer composition to a pH condition at and preferably below 7 and brings about rapid and efficient fixing, inactivation or desensitization of the partially polymerized composition upon the application of heat.

An additional object of this invention or improvement is to provide a permanent and fixed film of photopolymerized vinyl monomer material capable of image reproduction and viewing under conditions of light which would normally induce further polymerization.

It is a further particular object of this invention to provide an improved photo-redox catalyst system containing an organic sulfinc compound or a triorgano-substituted phosphine as a catalyst and a pH lowering reagent which can be stored with the photo-redox catalyst system for long periods of time without appreciably decreasing the photopolymerization initiating capability of the catalyst system.

Figure 2:
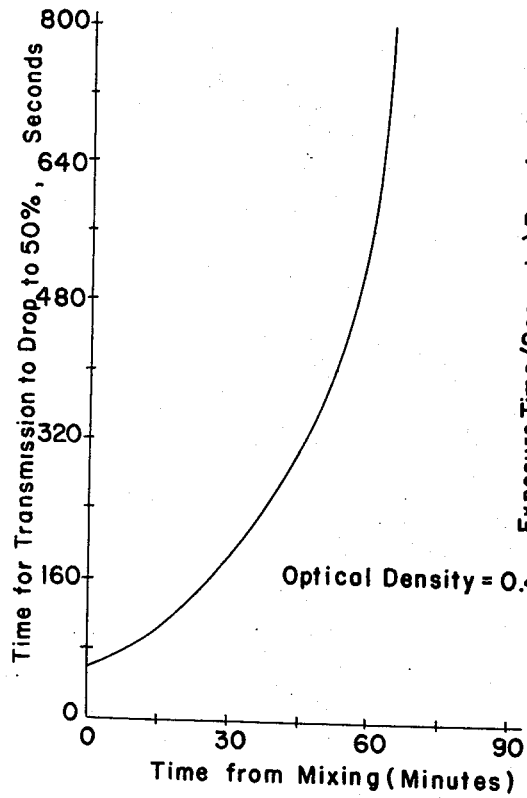
Figure 3:
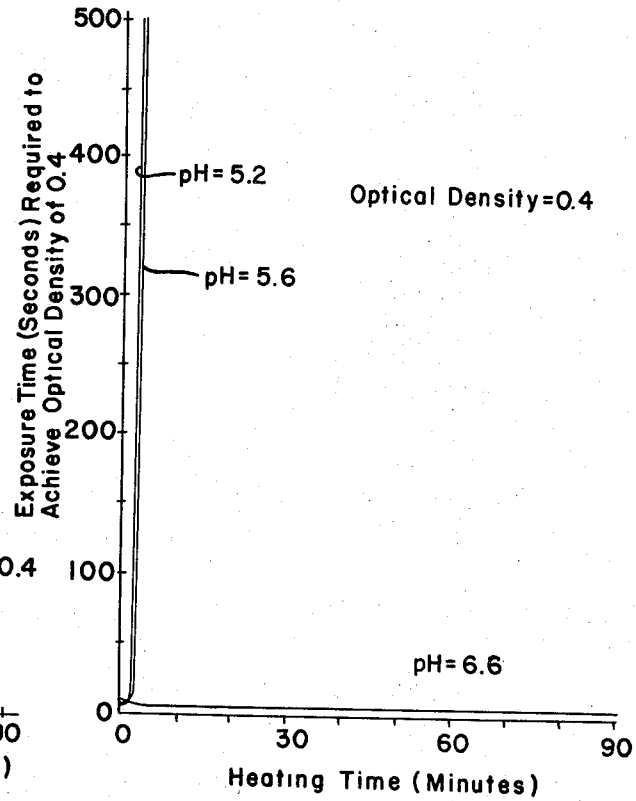

Other objects and advantages of this unique polymerization fixing, inactivating or desensitizing method and composition means will become apparent from the following description in conjunction with the drawing wherein:

FIG. 1 is a graph illustrating the manner in which certain photopolymerizable compositions of this invention are inactivated or desensitized as a function of heating time of the compositions for a given heating temperature;

FIG. 2 is a graphical representation of the time required for the light, transmitted by a partially desensitized photosensitive composition, to be reduced to 50 percent of its initial value, versus the storage time for the photosensitive composition maintained at 24.5° C.; and FIG. 3 is a graph illustrating how certain other photopolymerized compositions modified in accordance with this invention are inactivated or desensitized as a function of heating time of the compositions for a given heating temperature.

In general, the method and means of this invention utilize operable photosensitive compositions of the copending applications which can be modified by the critical inclusion therein of pH lowering reagents, as required herein for accomplishing the purposes of this new discovery. The pH lowering reagents are of two main types. The first type comprises those that decrease and maintain the pH of the photosensitive compositions of this invention to a critical value below and not above a pH of 7 upon admixture of these reagents, before fixation by application of heat, and irrespective of any pH relative to gel time. The second type comprises a latent reagent or those reagents that critically decrease the pH of the photosensitive compositions of this invention below and not above a pH of 7 upon the application of heat to the resulting system, but not before.

More particularly, in utilizing the method and composition mean of this invention, critical adjustment or control of the pH lowering reagent comprises: (1) adding to a photosensitive composition, a pH lowering reagent to attain, irrespective of gel time in the resulting system, a pH of not over 7 prior to exposure of the system to visible light; and (2) heating the photosensitive system, after partial polymerization with image formation, at a temperature and for a period of time which is dependent upon the pH of a particular photosensitive system, thereby to inactivate and fix or desensitize it permanently.

An alternative method and composition means for altering the pH comprises: (1) adding to the photosensitive compositions of this invention an acid producing reagent capable of producing an acid group when heated; and (2) heating the photosensitive composition after image formation, thereby simultaneously to cause the acid producing reagent to dissociate to reduce the pH to below about 7 and to inactivate and fix or desensitize permanently the photosensitive composition.

The photosensitive compositions (containing polymerizable monomer and a photo-redox catalyst system) with which the method and means of this invention are utilizable will first be described in detail.

Turning now to the specific components utilizable in this invention, the monomers will first be discussed. The monomers suitable for photopolymerization by the photo-redox catalyst system are described in the copending applications. Such monomers will be referred to herein by the term "vinyl monomers," and this term includes vinylidene chloride, vinyl methyl ether, vinyl butyl ether, vinyl butyrate, styrene, vinyl benzoate, methyl methacrylate, calcium diacrylate, barium diacrylate, acrylic acid, acrylonitrile, acrylamide, and the like.

The amount of vinyl monomer in the reaction medium can vary within extremely wide limits. On the one hand, the amount of monomer employed may be the maximum solubility of the particular monomer in a particular solvent. On the other hand, the monomer may be present in small molar concentrations of the order of $10^{-2}$ or $10^{-3}$ molar. In general, it is preferable to use relatively high monomer concentrations (greater than about $2.5 \times 10^{-3}$ molar) because it has been found that the rate of photopolymerization materially decreases at lower monomer concentrations.

It is highly desirable to utilize monomers having a functionality greater than two, so that highly cross-linked polymers which are insoluble and infusible are obtained at a low degree of conversion. It is known that the greater the functionality of a monomer, the lower the degree of conversion at the gel point (or the point at which insolubility of the polymer sets in). This being the case, a discernible photographic image is obtainable by the process of the present invention at low light levels and in short periods of time when monomers of high functionality are employed. Monomers having a functionality higher than two are typified by: N,N'-alkylenebisacrylamides, secondary acrylamides, tertiary acrylamides, di- or trivalent metal salts of acrylic or methacrylic acid, and the like. Such polyfunctional compounds are generally designated in the art as "cross-linking agents," and suitable examples for use in the process of the present invention are:

(1) alkylenebisacrylamides and their derivatives having the general formula:

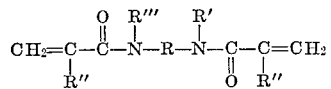

(2) secondary acrylamides or derivatives thereof having the general formula:

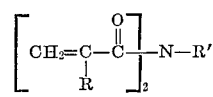

(3) tertiary acrylamides or derivatives thereof having the general formula:

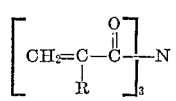

(4) and the polyvalent metal salts of acrylic acid or its derivatives having the general formula:

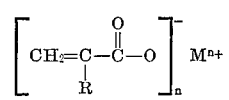

where $n$ is greater than one and M may be calcium, barium, strontium, magnesium, zinc, or aluminum, for example.

Where R, R', and R" may be H, OR''', alkyl, aryl, alkaryl, arylalkyl, and mixtures thereof, with R''' being the same as R, R' or R", the alkyl being 1 to 4 carbon atoms and the aryl at least an aromatic ring of 6 carbon atoms.

As specific examples of the above groups of cross-linking agents (1), (2), (3) and (4), N,N'-ethylenebisacrylamide, methyl-diacrylylamide, tri(methyl acrylyl) amide, N-methyl-diacrylamide, trimethacrylamide and calcium diacrylate, respectively, or mixtures thereof, may be used. Additionally, for example, the following compounds may be used as cross-linking agents: triallyl cyanurate, divinyl benzene, divinyl ketones, ethylene glycol diacrylate, diglycol diacrylate, mixtures of the same, and the like. Such cross-linking agents are inclusive of the methylene, ethylene, or trimethylene and tetramethylene compounds of the above character, as illustrated. Such cross-linking agents are also vinyl monomers with a functionality greater than 2. Accordingly, a single one monomer composition, or mixtures of suitable monomers, may be utilized in the pohtosensitive compositions, as embodied and described herein. Included in the above, for example, are such polymerizable monomer compounds as barium diacrylate, strontium diacrylate, N,N'-methyl-bisacrylamide, methacrylic acid, ethylene glycol diacrylate, sodium acrylate, glyceryl triacrylate, and the like.

The cross-linking agent may be used alone or in conjunction with monomers having a functionality of two. Where the latter combination is used, the cross-linking agent is generally employed in an amount ranging from 10 to 50 parts of bifunctional monomer to one part of cross-linking agent.

In general, the photo-redox catalyst system utilized in this invention is the same as described in the copending applications. That is, the photo-redox catalyst system comprises a latent light activated system, including a photo-oxidant and a catalyst as previously described herein. The photo-redox catalyst system used in the process of this invention differs from those described in the copending applications in that the catalyst used in this invention is limited to the organic sulfinic compounds and to the triorgano-substituted phosphines described in the copending applications. It has been found that the desensitization process of this invention is not effective when using a triorgano-substituted arsine as the catalyst. As used hereinafter, the term "catalyst" will refer to both the organic sulfinic and triorgano-substituted phosphine classes of compounds described in the copending applications.

As mentioned in the copending applications, only catalytic amounts of the catalysts are needed in the photo-redox catalyst system for photopolymerization. Thus, photo-redox polymerization, according to the present invention, may be achieved by using concentrations of the catalyst as small as $10^{-6}$ moles per liter of photosensitive solution. Hereafter, moles per liter will be used to designate "moles per liter of photosensitive solution." Hence, when measured against the quantity of the monomer, the amount of the catalyst can be exceedingly small. As an example, one-tenth of a millimole of organic sulfinic compound catalyst per liter of solution has been used to achieve a very satisfactory rate of photopolymerization. Higher concentrations, e.g., $10^{-2}$ molar, may result in somewhat accelerated rates of photopolymerization.

The organic sulfinic compounds of the copending patent applications are the aromatic and aliphatic organic sulfinic acids and operable derivatives thereof. For example, derivatives of the organic sulfinic acids, which can be employed, are sulfinyl halides, sulfinamides, salts and organic esters of the organic sulfinic acids, as well as adducts of sulfinic acids with carbonyl compounds and especially aldehydes. Each of these organic sulfinic compounds is characterized by its ability to form a free radical by giving up an electron to the photo-oxidant in its activated or photoactive state. The free radicals so derived from the organic sulfinic compounds are capable of initiating polymerization of the aforedescribed vinyl monomers.

Examples of the organic sulfinic acids are: p-toluenesulfinic acid, benzenesulfinic acid, p-bromobenzenesulfinic acid, naphthalenesulfinic acid, 4-acetamidobenzenesulfinic acid, 5-salicylsulfinic acid, ethanesulfinic acid, 1,4-butanedisulfinic acid, and α-toluenesulfinic acid. The salts of these acids may be any of the soluble salts which are compatible with the other components employed in the photosensitive solution and typically include the sodium salts, the potassium salts, the lithium salts, the magnesium salts, the calcium salts, the barium salts, the silver salts, the zinc salts, the aluminum salts, and the like. Appropriate esters of these acids typically include the methyl esters, the ethyl esters, the propyl esters and the butyl esters.

The sulfinyl halides include sulfinyl chlorides, for example, ethanesulfinyl chloride, and sulfinyl bromides, for example, 5-salicylsulfinyl bromide. The sulfinamides include, for example, ethanesulfinamide; the N-alkylsulfinamides such as N-methyl-p-toluenesulfinamide; and the N-arylsulfinamides such as N-phenylbenzenesulfinamide. Aldehyde adducts of these sulfinic acids are, for example, the adducts formed with formaldehyde, acetaldehyde, isobutyraldehyde, heptaldehyde, and the like.

The triorgano-substituted phosphines of the copending patent applications are the aliphatic and aromatic derivatives of phosphine. For example, tributylphosphine, triphenylphosphine, dibutylphenylphosphine, methyldiphenylphosphine, methylbutylphenylphosphine, and the like, may be used.

The photo-oxidant compounds for use in the photo-redox catalyst system of this invention are any of those compounds that absorb sufficient radiation within the wavelengths of about 3800 A. to about 7200 A. to thereby attain a photoactive or photo-oxidant level, provided that at such level the photo-oxidant compounds are capable of reacting with the latent catalyst component, for example, an organic sulfinic compound or triorgano-substituted phosphine to remove an electron therefrom to produce a polymerization initiating, highly reactive free radical.

The specific photo-oxidants usable in the process of this invention are preferably those disclosed in the copending applications and are incorporated herein by reference. More particularly, preferable examples are members of the quinoidol dye family such as phenothiazine dyes, phenazine dyes, acridine dyes, xanthene dyes, phenoxazine dyes and pyronine dyes.

The minimum required concentration of photo-oxidant of the photo-redox catalyst system is approximately $10^{-7}$ moles per liter. As the photo-oxidant concentration is increased above this minimum concentration, the sensitivity of the photopolymer composition does increase; however, the sensitivity may pass through a maximum as the photo-oxidant concentration is further increased so that it may be desirable to avoid high concentrations ($10^{-2}$ moles per liter or more), especially when the photosensitive solution to be polymerized is of greater thickness than a very thin film. However, since the optical properties of the photo-oxidant are dependent upon the quantities present, as well as upon the intensity of the radiation employed, the criteria for determining the proper or practical quantities of photo-oxidant and catalyst to be employed will be governed by considerations other than just the amount needed for catalyzing the photopolymerization reaction.

The concentration of each component, individually, is important. Thus, if the concentration ranges, heretofore set forth, are met, rapid polymerization will occur when the composition is illuminated with light of appropriate wavelength prior to desensitization regardless of the relative ratios of the components.

The control of the pH of the photosensitive compositions, heretofore described, may be altered by adding various acids thereto. Such acids include strong and weak acids, inorganic and water soluble organic acids. For example, hydrochloric acid, sulfuric acid, phosphoric acid, formic acid, acetic acid and acrylic acid may be used.

It will be understood that an extraneous pH lowering reagent may be added to the photosensitive composition to lower its pH to a desired level or, alternatively, that additional amounts of any acidic member of the components comprising the photosensitive composition may be employed as pH lowering reagents. As an example of the alternative method of lowering the pH of the photosensitive compositions, an acid catalyst, for example, sulfinic acid, or an acid vinyl monomer, for example, acrylic acid, may be employed.

It is preferable when the vinyl monomer is used in the form of a salt, for example, barium diacrylate, to use acids which do not produce a precipitate with such salts. Hydrochloric acid is a suitable example of a non-precipitate forming acid whereas sulfuric and phosphoric acids produce precipitates with, for example, barium diacrylate. Where a precipitate is produced, it should be filtered off prior to exposing the photosensitive composition to image forming light. If such a precipitate is not removed, the detail of photopolymer image will be significantly reduced.

As noted polymer fixing, inactivation or desensitization by the herein described process depends upon both the pH of the photosensitive composition and the amount of heat received by the photosensitive composition. Employed separately, neither of these factors will cause rapid fixing, inactivation or desensitization. However, when acting together, both factors produce very rapid and permanent fixing, inactivation or desensitization of the photopolymer system.

The effect of heating the photosensitive composition wherein the pH is high, e.g., 6.6 or higher, is shown in Tables 2 and 3. These tables consist of data derived as described in Examples 1 and 2, respectively. Briefly, in both examples, a photosensitive composition, comprising a polymerizaable monomer and a photo-redox catalyst, was heated for varying periods of time of 80° C. and then exposed to a visible light source. These examples basically differ from each other in the use of methylene blue and thionine in Examples 1 and 2, respectively, as the photo-oxidant.

The time taken to produce specific optical densities in the photosensitive composition was measured and recorded. The optical density is a measure of the light transmitted by the photosensitive composition. As photopolymerization of the vinyl monomer takes place, the amount of light transmitted by the photosensitive composition decreases due to the formation of an opaque polymer precipitate. Therefore, the optical density is also a measure of the degree of polymerization of the photosensitive composition.

From Tables 2 and 3 it can be seen that at pH's of 6.6 and 7.3, little desensitization occurs regardless of the amount of heating of the photosensitive system. Thus, even after heating the composition for 210 minutes at a pH of 7.3, as shown in Table 2, 8.8 seconds are required to produce an optical density of 0.1 whereas without heating of the same composition, a time period of 5.5 seconds was required to achieve a density of 0.1. Also, at a pH of 7.3, the composition requires 55 seconds to achieve a density of 1.0 where the system has previously been heated for 210 minutes at 80° C. Without such heating, the composition polymerizes to the same extent in 14.6 seconds. Thus while some fixing desensitization can be produced by heating the composition at a pH as high as 7.3, such desensitization is produced only atfer impractically long heating periods.

The effect of pH lowering without heating of the photosensitive composition is also shown in Tables 2 and 3 by the data set out adjacent to the heating period designated "none" or "0." Changes in photosensitivity of the photosensitive composition due to a lowering of pH, per se, are small. For example, in Table 3 a pH lowering from 6.6 to 5.2, in the absence of heating, caused an increase in time of 0.6 second to achieve the same polymerization (at an optical density of 0.6). Further, a decrease in pH per se, may result in either an increase or a decrease in photosensitivity depending upon the physical characteristics of the photosensitive composition such as, for example, its freshness. As can be seen from the data of Tables 2 and 3, the sensitivity of the photosensitive composition actually increases as the pH decreases. For example, in Table 2, the time required to produce an optical density of 0.1 at a pH of 7 is 5.2 seconds, whereas the same optical density is reached in 3.2 seconds at a pH of 5.2. Thus, it will be appreciated that a decrease in pH alone does not produce significant desensitization of a photosensitive composition, and, in some instances, an increased sensitivity results.

From the foregoing, it will be understood that fixing, inactivating or desensitization of a photosensitive composition containing a polymerizable monomer and the specific photo-redox catalyst composition cannot be accomplished either by merely adjusting the pH of the photosensitive composition or by merely heating the photosensitive composition. However, when these two factors are used in combination, fixing, inactivating or desensitization of the polymer mass occurs rapidly and is permanent.

The theoretical reason for fixing, inactivation or desensitization of the photosensitive compositions of this invention by heating at an appropriate pH is not entirely known. However, it is believed that the catalysts of this invention add directly to the double bond of the photopolymerizable monomer in a manner somewhat analogous to the addition reaction between ethene and a bisulphite. Such addition results in forming a new and inactive compound of the catalyst and thereby eliminates the catalyst as a free radical forming, polymerization initiating compound.

The combined effect of pH and heat is illustrated by the following example:

EXAMPLE 1

A barium diacrylate solution was prepared by adding 321 grams of barium hydroxide octahydrate to a solution of 144 grams of freshly distilled acrylic acid in 150 ml. of distilled water. The pH of the solution was 12.5. Solutions A, B, C and D were made by adding acrylic acid to portions of this solution to adjust the pH as follows: Solution A—7.3; Solution B—6.6; Solution C—5.6; Solution D—5.2.

A photocatalyst solution (Solution E) was prepared by mixing 2.14 g. of sodium p-toluenesulfinate dihydrate and 0.030 g. of methylene blue in 200 ml. of distilled water.

Solutions F, G, H and I were prepared as follows:

Solution F: 2 ml. of Solution A and 1 ml. of Solution E
Solution G: 2 ml. of Solution B and 1 ml. of Solution E
Solution H: 2 ml. of Solution C and 1 ml. of Solution E
Solution I: 2 ml. of Solution D and 1 ml. of Solution E Portions of each of the Solutions F, G, H and I were placed in individual containers consisting of two glass plates separated by a peripheral shim spacer 7 mils thick. These containers were then heated at 80° C. for varying periods of time and then cooled between metal plates for 3 minutes. Each of the containers was then irradiated with light of intensity 6.25 milliwatts/cm.$^2$. As polymerization took place to form opaque polymers, there was a corresponding decrease in transmitted light. This decrease was monitored by measuring the transmitted light with a photomultiplier tube and recorded as the illumination time required to produce optical densities of 0.1, 0.2, 0.4, 0.6, 0.8 and 1.0.

The resulting data are given in Table 2. FIG. 1 presents the time required to achieve an optical density of 0.1 and 0.4 as a function of the heating period at each pH.

TABLE 2

| pH of barium diacrylate solution | Time in oven, min. | Time (sec.) of illumination required to achieve optical density of:— | | | | | |
|---|---|---|---|---|---|---|---|
| | | 0.1 | 0.2 | 0.4 | 0.6 | 0.8 | 1.0 |
| 7.3 | None | 5.2 | 6.3 | 8.2 | 10.1 | 12.2 | 14.6 |
| | 10 | 2.6 | 3.4 | 5.0 | 6.4 | 8.0 | 9.8 |
| | 30 | 2.0 | 2.8 | 4.7 | 6.6 | 8.8 | 9.0 |
| | 90 | 3.4 | 4.2 | 7.0 | 10.0 | 12.8 | 18.4 |
| | 120 | 3.3 | 5.4 | 9.0 | 11.6 | 15.4 | 20.0 |
| | 150 | 6.8 | 11.0 | 18.6 | 26.0 | 33.2 | 41.4 |
| | 210 | 8.8 | 14.8 | 24.4 | 34 | 45.2 | 55.2 |
| 6.6 | None | 6.2 | 7.6 | 10.0 | 12.2 | 15.4 | 18.8 |
| | 9 | 2.8 | 3.6 | 4.8 | 6.4 | 8.0 | 10.0 |
| | 18 | 2.8 | 3.8 | 5.0 | 6.2 | 7.8 | 9.0 |
| | 40 | 2.2 | 3.2 | 5.0 | 7.0 | 9.2 | 11.4 |
| | 60 | 3.8 | 6.0 | 8.2 | 10.0 | 12.2 | 14.8 |
| 5.6 | None | 4.4 | 5.4 | 7.0 | 8.6 | 10.2 | 13.0 |
| | 4.0 | 3.7 | 4.8 | 6.8 | 9.4 | 12.6 | 16.8 |
| | 6.0 | 6.4 | 8.8 | 14.6 | 20.8 | 29.2 | 38.4 |
| | 8.0 | 200 | | | | | |
| | 12.0 | Slight polymerization within 640 sec. | | | | | |
| | 14 | No polymerization within 700 sec. | | | | | |
| 5.2 | None | 3.2 | 4.0 | 6.0 | 8.2 | 10.8 | 14.2 |
| | 3.0 | 4.4 | 5.4 | 9.6 | 13.6 | 11.2 | 28.0 |
| | 3.5 | No polymerization within 500 sec. | | | | | |
| | 4.0 | No polymerization within 600 sec. | | | | | |

The effect of the combination of low pH and heating can be best understood by comparing the desensitization produced at pH's 7.3 and 6.6 with the desensitization produced at pH's 5.6 and 5.2. At the two higher pH's, no significant desensitization occurs even after hours of heating. By comparison, less than 15 minutes of heating at pH of 5.6 and less than 5 minutes of heating at pH 5.2 are required to produce substantially complete desensitization. Thus, it will be appreciated that desensitization occurs very rapidly at pH's of less than about 6.0 when this photosensitive composition is heated at 80° C.

As shown in the preceding example, the upper pH limit, below which rapid desensitization (2–15 minutes of heating) occurs, exists at about pH 6.0 for the particular photosensitive composition described therein and for a heating temperature of 80° C. The pH limits, in relationship to heating and fixing of the partially polymerized photopolymer, will depend to some extent on the particular components in the photosensitive composition. For example, it will be recognized that the raise in temperature is normally from that of the lower level of environment at which actinic radiation occurs to initiation polymerization, to a level at most below the boiling point of the particular solvent and the time required is controlled by the regulation of the pH.

This upper pH limit will also be affected by the temperature at which the photosensitive composition is heated. As the heating temperature increases for any given length of time, the upper pH limit, for rapid desensitization, will increase, i.e., approach a pH of about 7. Conversely, as the heating temperature decreases, the upper pH limit will decrease, i.e., acidic compositions will be required to provide rapid desensitization.

Although desensitization will progress more rapidly as the temperature at which heating occurs increases, there is a limiting heating temperature. Such limiting temperature depends upon the temperature characteristics of the components of the photosensitive composition, and should be maintained below the boiling point of any of the components of the photosensitive composition. In general, the temperature to which the photosensitive composition can be heated will be limited by the boiling point of the solvent component in the photosensitive compositions.

At about room temperature and at a pH less than about 7, desensitization can be effected by the method and means of this invention, as shown, for example, by Example 4. However, desensitization of the herein described photosensitive compositions at these temperatures and pH conditions is very slow and thus does not appreciably affect the rapid rate of the photopolymerization process described in the copending applications. For example, at room temperature, photopolymerization by the method of the copending applications can be completed within seconds, wherein the herein described fixing, inactivating or desensitization method may require from a short time to many hours, dependent upon the relationship of the pH to the heat applied.

To achieve rapid desensitization, it is preferable to operate at temperatures substantially above room temperature, for example, above about 40° C. It will however, be appreciated that desensitization of the photosensitive compositions described herein will occur at temperatures below about 40° C., although at a significantly slower rate.

As noted in the foregoing paragraphs, the upper pH limit will depend upon the heating temperature and upon the particular components of the photsensitive composition. Thus, the adjustment of pH will depend upon the particular requirements of each application. However, the upper pH limit will generally be about 6.6, but can be as high as about 7.0 with certain compositions falling within the scope of this invention that can be heated at temperatures above 80° C. for desensitization.

Insofar as improved desensitization is concerned, there appears to be no lower pH limit. That is, pH decreases are accompanied by improvements in desensitization in conjunction with the heating steps as described. However, practical pH limits may exist based upon compatibility and stability of the components in the photosensitive composition at low pH levels. Thus, for practical application a pH of 2 or above 2 is preferred as, for example, may be provided by addition of acrylic acid, or an addition acid, latent or otherwise.

As described in the copending applications, the effect of pH on the rate of the photopolymerization reaction is small. Thus, it will be appreciated that a positive use of pH's below about 2 of this invention will not deleteriously affect the rate of the photopolymerization reaction.

It will be evident from Table 2, and more graphically from FIG. 1, that there is an intermediate period of time, during the heating of the photosensitive composition, within which the composition apparently becomes more sensitive to the polmerization reaction rather than less sensitive thereto. For example, as shown by the pH 7.3 curve in FIG. 1, the time required to produce an optical density of 0.4 is the same at 110 minutes of heating as it is at zero minutes of heating. Between these two heating times, the sensitivity of the photosensitive composition to the polymerization reaction is greater than at the zero and 110 minute points. At heating periods longer than 110 minutes this photosensitive composition becomes increasingly more insensitive to photopolymerization as compared with the unheated sample.

It is preferable not to store photosensitive compositions for substantial periods of time when such compositions have a low pH. This is because some desensitization will occur even at room temperatures at very low pH's when given sufficient time. Therefore, to permit storage for relatively long periods of time, it is preferable to include a latent acid producing reagent in the photosensitive composition. A latent pH lowering reagent, as used herein and in the claims, is a compound which, when heated, splits off an acid group from itself thereby lowering the pH of the photosensitive composition. An example of such a reaction is the splitting off of hydrogen chloride from chlorohydrin to produce hydrochloric acid in aqueous solution. As further examples of latent reagents, ethylene chlorohydrin, 3-chloro-1, 2-propylene glycol, trimethylene chlorohydrin, 1,3-dichloro-2-propanol, chloroacetic acid, dichloroacetic acid, or mixtures of the same, and the like may be used. As latent acid producing reagents in the process of the present invention, hydrolyzable esters which readily split into acid and alcohol when heated, such as ethyl sulfate, methyl tosylate, dimethyl phthalate, ethyl trichloroacetate, and the like may be employed.

The photopolymerization process of the present invention is preferably carried out in a solvent medium, i.e., a solution of the involved compounds including the pH lowering reagent. The particular solvent employed will be one that is compatible for the components of this invention. Thus, if the monomer, the photo-redox catalyst system and the pH lowering agent are water soluble, such as in a system employing, for example, acrylamide as the monomer, thionine as the photo-oxidant, sodium p-toluenesulfinate as the catalyst, and acrylic acid, an aqueous solution may be employed. Where a common solvent for the monomer, photo-redox catalyst system, and acid is not available, different solvents which are miscible with each other may be employed. Water, alcohols, such as methanol, ethanol, 1 propanol, 2 propanol, glycerol, ethylene glycol, dioxane, and the like have been used as suitable solvents in the process of the present invention.

The components of the photosensitive composition may be added together in any order to make the photosensitive composition as described in the copending applications. For example, the pH lowering reagent may be added to any of the other components or to an admixture of the other components. Also, each component may be dissolved in solution before addition to the other components or, each component may be dissolved in a solution containing the other components. When a precipitate is produced, as upon acidification, the precipitate should be filtered off before further admixing takes place as described in Example 2.

Where it is desired to produce the photosensitive compositions of this invention in an emulsion form suitable for use as a photographic film, a suitable substrate, e.g., glass slides, conventional film backing, non-transparent or transparent cellulose acetate, or the like, may be coated with the photosensitive or modified photosensitive compositions of this invention. Modification of the photosensitive composition of this invention comprises adding a thickener or gelling agent thereto to increase their viscosity. This viscosity increase causes the modified composition to be more easily retained by the substrate and thereby produce a more stable and permanent film.

Excellent results may be achieved by adding the thickener or gelling agent in amounts of about a few percent by weight of the total modified photosensitive composition. Because only small amounts of thickeners and gelling agents need be used, the concentration limits of the components of the photosensitive compositions will remain about the same as previously described when the photosensitive compositions are made more viscous. As examples of suitable thickeners and gelling agents, polyvinylpyrrolidone, polysaccharides and gelatin can be used.

The desensitization process of this invention will be further described by the following examples.

EXAMPLE 2

This example illustrates the desensitization of photosensitive compositions containing thionine as the photo-oxidant.

Barium diacrylate solutions (Solutions A, B and C) were identical to Solutions B, C and D of Example 1, and had pH's of 6.6, 5.6, and 5.2, respectively.

A photo-oxidant solution (Solution D) was prepared by dissolving 0.0302 gram of thionine in 100 ml. of distilled water.

A solution (Solution E) containing catalyst was prepared by dissolving 5.35 grams of sodium p-toluenesulfinate dihydrate in 50 ml. of distilled water.

Photosensitive solutions (F, G and H) were obtained by mixing the above solutions and water as follows:

Solution F: 2.0 ml. of Solution A, 0.4 ml. of Solution D, 0.1 ml. of Solution E, and 0.5 ml. of water.
Solution G: 2.0 ml. of Solution B, 0.4 ml. of Solution D, 0.1 ml. of Solution E, and 0.5 ml. of water.
Solution H: 2.0 ml. of Solution C, 0.4 ml. of Solution D, 0.1 ml. of Solution E, and 0.5 ml. of water.

Solutions F, G and H were placed in cells and heated at 80° C. as described in Example 1. The data shown in Table 3 were produced by illuminating these solutions in the manner described in Example 1. FIG. 3 is a graphical representation of the time required to obtain an optical density of 0.4 and is based on that data shown in Table 3 having reference to this particular optical density.

TABLE 3

| pH of barium diacrylate solution | Time in oven, min. | Time (sec.) of illumination required to achieve optical density of.— | | | | | |
|---|---|---|---|---|---|---|---|
| | | 0.1 | 0.2 | 0.4 | 0.6 | 0.8 | 1.0 |
| 6.6 | None | 6.5 | 7.7 | 10.0 | 12.8 | 16.0 | 20.4 |
| | 9 | 3.2 | 4.2 | 6.3 | 8.5 | 12.0 | 16.4 |
| | 18 | 2.6 | 3.6 | 5.6 | 7.8 | 10.8 | 15.6 |
| | 40 | 3.1 | 4.2 | 6.2 | 9.0 | 13.0 | 18.8 |
| | 60 | 3.6 | 4.6 | 6.5 | 8.8 | 11.2 | 15.2 |
| | 90 | 3.3 | 4.4 | 6.5 | 9.1 | 13.2 | 18.8 |
| 5.6 | None | 4.8 | 6.2 | 9.0 | 13.2 | 21.8 | 35.0 |
| | 3 | 3.6 | 4.8 | 9.0 | 13.6 | 25.2 | 46.0 |
| | 7.5 | | | | | | |
| | 9 | Only slight polymerization within 500 sec. | | | | | |
| 5.2 | None | 4.7 | 4.6 | 7.6 | 13.4 | 27.2 | 48.0 |
| | 2.5 | 3.1 | 4.8 | 8.8 | 16.8 | 34.0 | |
| | 3.0 | 286 | | | | | |
| | 4.0 | No polymerization within 400 sec. | | | | | |

As shown in the data of Table 3 and FIG. 3, substantial increases in desensitization are effected by decreasing the photosensitive composition pH below about pH 6.0, when heating thereof is performed at 80° C.

EXAMPLE 3

This example illustrates the extremely rapid desensitization which can be obtained by the process of this invention when very low pH's (4.6) are used and when the photosensitive composition is heated at a relatively high temperature (85° C.).

A barium diacrylate solution (Solution A) was prepared by adding 321 g. of barium hydroxide octahydrate to a solution of 144 g. of freshly distilled acrylic acid in 150 ml. of distilled water. Acrylic acid was then added to adjust the pH to 4.6, and the solution was filtered.

A photocatalyst solution (Solution B) was prepared by mixing 2.14 g. of sodium p-toluenesulfinate dihydrate and 0.030 g. of methylene blue in 200 ml. of distilled water.

Solution C was prepared by mixing 2.0 ml. of Solution A and 1.0 ml. of Solution B.

Solution C was placed in the central cavity of a container consisting of two glass plates separated by a peripheral shim spacer 7 mils thick. One filled slide was irradiated with light from a 500-watt tungsten filament lamp at an intensity of about 6.25 milliwatts/cm.$^2$. As polymerization took place to form opaque polymers, there was a corresponding decrease in transmitted light. The polymerization was followed by measuring the transmitted light with a photomultiplier tube. Two similar slides were first heated in a water bath at 85° C., one for 10 sec. and one for 15 sec., and then exposed to light in a similar manner. The results are shown in the table below.

TABLE 4

| Period of heating (sec.) | Exposure time (sec.) required to achieve optical density of.— | | | |
|---|---|---|---|---|
| | 0.1 | 0.2 | 0.4 | 0.6 |
| 0 | 5.2 | 5.7 | 6.4 | 7.0 |
| 10 | 23.4 | 29.0 | 42.0 | 63.2 |
| 15 | No polymerization within 480 sec. of illumination. | | | |

As can be seen from the data of Table 4, substantially complete desensitization is accomplished with only 15 seconds of heating. Thus it will be understood that the initial temporary sensitization previously described is practically eliminated at this pH and heating temperature.

EXAMPLE 4

This example illustrates the effectiveness of the process of this invention when desensitizing a photosensitive composition containing a triorgano substituted phosphine reducing agent and specifically, triphenylphosphine. It also illustrates the use of an alcohol, 1-propanol, as the solvent for each of the components.

A solution of barium diacrylate (Solution A) was prepared by adding 78.7 grams of barium hydroxide octahydrate to 78.7 ml. of 1-propanol and 36.0 ml. of distilled acrylic acid. The solution was stirred for 1½ hrs. at a temperature of 60–70° C. and filtered. A small amount of acrylic acid was added to adjust the pH to 6.7.

A solution (Solution B) of methylene blue was prepared by dissolving 0.0312 gram of methylene blue in 100 ml. of 1-propanol.

A triphenylphosphine solution (Solution C) was prepared by dissolving 2.6194 grams of triphenylphosphine in 100 ml. of 1-propanol.

A photosensitive solution (Solution D) was prepared by mixing 3.5 ml. of Solution A, 0.5 ml. of Solution B, 0.5 ml. of Solution C and 0.5 ml. of water.

Portions of Solution D were used to fill glass slide containers. These slides were prapared by using 7 ml. plastic tape as a shim around the outer edges of 2″ x 2″ glass plates leaving the center portion (1″ x 1″) as a well. In each case a second glass plate was used as a cover, and the two plates were taped firmly together. The slides were prepared and stored at 24.5° C. for desensitization. At varying time intervals, the panels containing the solution were exposed to white light at an intensity of 16.7 milliwatts/cm.$^2$. The polymerization was followed by measuring the transmitted light with a photomultiplier tube and recording the measurements with a Sanborn recorder. The exposure time required for the transmitted light to decrease to 50% of its original value is shown in FIG. 2 as a function of the storage time during which desensitization took place.

As will be seen from FIG. 2, under standard conditions of initiating photopolymerization and standing at 24.5° C. at a pH of 6.7, sufficient polymerization to reduce the transmitted light to 50% of the intensity of the incident light cannot take place in a matter of 65 minutes. Thus, without raising the temperature for fixing polymerization in a shorter period of time, as herein provided, no additional advantage is gained.

EXAMPLE 5

This example illustrates the improved desensitization of a barium diacrylate solution, heated at 74–76° C. for varying periods, as the pH decreases. It also illustrates the use of a strong acid, sulphuric acid, to lower the pH of the photosensitive composition.

A barium diacrylate solution (Solution A) was prepared by combining barium hydroxide octahydrate (315 g.), distilled water (315 ml.), and acrylic acid (144 ml.) and heating the mixture for 2 hours at 60–80° C., with stirring. A small amount of insoluble material was removed by filtration. The pH of the solution was 5.93.

To a portion of Solution A was added a small quanttiy of sulfuric acid, and the precipitate was filtered off. The pH of the solution (Solution B) was 5.32.

This solution (Solution C) was prepared like Solution B but with a pH of 5.02.

Sodium p-toluenesulfinate dihydrate (2.14 g.) and methylene blue (0.030 g.) were dissolved in water (100 ml.) to produce Solution D.

Test solution mixtures of controlled pH values were prepared from the above by mixing in each case 1.00 ml. of Solution A, Solution B and Solution C with 0.25 ml. of Solution D and 0.25 ml. of distilled water. Each solution was placed between two glass slides separated by a peripheral shim 7 mils thick. The slides were heated for various periods of time in an oven at 74–76° C. and then cooled for about 3 minutes. Small areas of each slide were irradiated with light from a 500-watt tungsten filament projection lamp, and the transmitted light as detected with a photomultiplier tube was determined as a function of time. The results are shown in the following table (Table 5).

TABLE 5

| pH of barium diacrylate solution | Time in oven, min. | Time (sec.) of illumination required to achieve optical density of.— | | | | | |
|---|---|---|---|---|---|---|---|
| | | 0.1 | 0.2 | 0.4 | 0.6 | 0.8 | 1.0 |
| 5.93 | 0 | 29.2 | 33.7 | 37.8 | 41.2 | 44.6 | 48.2 |
| 5.93 | 10 | 12.3 | 14.5 | 18.6 | 22.0 | 26.2 | 31.4 |
| 5.93 | 15 | 42.4 | 51.5 | 64.8 | 76.2 | 89.6 | 101.6 |
| 5.93 | 20 | 81.2 | 106 | 139.6 | 174 | 206.4 | 254 |
| 5.32 | 0 | 32.3 | 38.4 | 46.5 | 49.8 | 58.2 | 66.2 |
| 5.32 | 3 | 21.0 | 25.6 | 33.6 | 41.2 | 49.6 | 59.4 |
| 5.32 | 4.5 | 60.6 | 77.4 | 99.6 | 123.6 | 147.7 | 179.8 |
| 5.32 | 6.0 | Optical density of about 0.05 within 750 sec. | | | | | |
| 5.02 | 0 | 34.4 | 42.0 | 54.4 | 67.4 | 80.6 | 97.2 |
| 5.02 | 1.5 | 21.7 | 26.8 | 36 | 45.8 | 58.6 | 73.5 |
| 5.01 | 3.0 | Optical density of 0.05 within 663 sec. | | | | | |
| 5.02 | 4.0 | Optical density remained that of background after 900 sec. illumination. | | | | | |

From Table 5, it can be seen that a substantial increase in the rate of desensitization of the photosensitive composition is effected by lowering the pH of the composition and heating.

EXAMPLE 6

This example illustrates the effect of using various catalysts on the rate of desensitization, other factors such as the pH, heating temperature and heating time being kept constant.

Solution A: Acrylic acid (144 ml.) was added to an aqueous solution of barium hydroxide prepared from barium hydroxide octahydrate (315 grams) and distilled water (315 ml.). The resulting solution was heated to 60–80° C. and kept at that temperature for two hours. It was then treated with about 16.5 grams of activated carbon and filtered. The pH of the solution was adjusted to 6.22 by the addition of acrylic acid.

Solution B: Methylene blue (0.0229 gram) was dissolved in methanol (100 ml.).

Solutions C, D, E and F illustrate the various catalysts.

Solution C: Sodium p-toluenesulfinate dihydrate (2.150 grams) was dissolved in distilled water (200 ml.).

Solution D: Sodium benzenesulfinate (0.825 gram) was dissolved in distilled water (100 ml.).

Solution E: 4 - acetamidobenzenesulfinic acid (0.985 gram) was mixed with distilled water (100 ml.), and a concentrated sodium hydroxide solution (5 drops) was added to effect complete solution of the acid.

Solution F: Hydroxymethyl p-tolyl sulfone [1] (0.932 gram) was dissolved in distilled water (100 ml.).

Test solutions were prepared from the above solutions as shown in Table 6.

TABLE 6

| | Solution A, ml. | Solution B, ml. | Solution of sulfinic compound, ml. |
|---|---|---|---|
| Solution: | | | |
| G | 2.0 | 0.5 | Solution C, 1.0. |
| H | 2.0 | 0.5 | Solution D, 1.0. |
| I | 2.0 | 0.5 | Solution E, 1.0. |
| J | 2.0 | 0.5 | Solution F, 1.0. |

Portions of these test solutions were placed in glass cells formed from two thin glass plates separated by plastic peripheral shims 7 mils thick. These cells were heated in an oven at a temperature of 80° C. for varying periods of time. Each cell, when it was removed from the oven, was allowed to cool between metal plates for four minutes and then placed in a beam of light from ---
[1] This is an example of an adduct of paratoluene sulfinic acid and formaldehyde.

a 500-watt tungsten filament projection lamp operated at 115 volts. The intensity of the incident light was approximately $1.2 \times 10^{-3}$ watts/cm.$^2$ and was kept constant. The transmitted light was measured with a photomultiplier tube and automatically recorded as a function of time. The effect of the length of the period of heating on the polymerization behavior in light is noted in Table 7.

TABLE 7

| Solution | Time of heating at 80° C., min. | Polymerization behavior in light |
| --- | --- | --- |
| G (sodium p-toluene sulfinate). | 5 | Polymerized to optical density of 1.0 in 40 sec. |
| | 6 | Slight polymerization. |
| | 7 | No polymerization within 15 min. |
| H (sodium benzene-sulfinate). | 5 | Polymerized to optical density of 1.0 in 40 sec. |
| | 7 | Polymerized to optical density of 1.0 in 170 sec. |
| | 9 | No polymerization within 15 min. |
| I (4-acetamidobenzene-sulfinic acid). | 6 | Polymerized to optical density of 0.2 in 36 sec. |
| | 7 | Slight polymerization within 230 sec. |
| | 9 | No polymerization within 10 min. |
| J (hydroxymethyl p-tolyl sulfone). | 6 | Polymerized to optical density of 0.2 in 42 sec. |
| | 7 | No polymerization within 15 min. |

As will be evident from Table 6, different rates of desensitization are obtained as the identity of the catalyst system is changed. However, it will be noted that rapid desensitization is obtained regardless of the specific organic sulfinic catalyst employed. Thus, desensitization in essentially complete for each of the test compositions after less than 10 minutes of heating at 80° C.

EXAMPLE 7

This example illustrates the utility of the process of this invention by showing the effect of projecting an initially photosensitive composition containing a photopolymer image for a period of time following desensitization by the invention.

Solution A: Thirty milliliters of an aqueous solution containing 45% barium diacrylate by weight were combined with 10 ml. of distilled water and enough acrylic acid to adjust the pH to 4.6.

Solution B: This solution was prepared by dissolving 2.143 g. of sodium p-toluenesulfinate dihydrate and 0.030 g. of methylene blue in 100 ml. of water.

A photosensitive solution was obtained by mixing 4 ml. of Solution A with 1 ml. of Solution B. A portion of this solution was placed between two glass plates separated by a peripheral shim of plastic tape 7 mils thick. A negative was inserted in an ordinary slide projector with a 500-watt tungsten filament projection lamp, and the image of the negative was projected onto the slide containing the photosensitive solution. A photopolymer image of the subject was formed during an exposure of 1.5 sec. The slide was then heated for 6 min. in an oven at 80° C., cooled for 3 min., and projected with the same projector for more than 3 min. The projected image remained distinct and substantially unchanged during the projection.

EXAMPLE 8

The purpose of this example is to illustrate the means whereby a flexible plastic substrate film may be coated with the compositions of this invention, exposed to image forming radiation and thereafter be fixed, inactivated or rendered insensitive to further exposure to light. The following solutions were prepared:

Solution A: Fourteen grams of a commercial polyacrylamide known to the trade as PAM–50, 2.38 grams of sodium p-toluene-sulfinate dihydrate and 0.012 gram of thionine were mixed with 100 ml. of distilled water. The mixture was heated on a hot water bath with stirring to about 60° to 80° C. until a clear blue, viscous, bubble-free solution was secured. The solution was very viscous at room temperature.

Solution B: A solution consisting of 50% by weight of barium diacrylate was prepared in distilled water.

Solution C: Was prepared in the dark by mixing:

2 ml. of Solution A
2 ml. of Solution B
½ ml. of 37½% aqueous formaldehyde solution which had previously been acidified by adding acrylic acid.

Formaldehyde was added to Solution C in order to react with the polyacrylamide of Solution A to produce a strong gel. The gelation reaction of formaldehyde and polyacrylamide proceeds slowly at room temperature but rapidly at elevated temperatures.

The thick and viscous Solution C was spread on a one mil polyethylene terephthalate polymer plastic substrate, known to the trade as "Mylar," film to a thickness of five mils and allowed to stand for a few minutes to thicken somewhat. The substrate film containing the photosensitive film was exposed to a projected photographic negative for 70 seconds to obtain a very clear, well developed image in the photosensitive film. After exposure and still in the dark, the substrate film containing the exposed photosensitive film was heated in an oven at 65° C. for 1¼ hours. In this time, the photosensitive film had become completely desensitized to light and the photosensitive film had become converted into a tough elastic gel because of the reaction of the formaldehyde with the polyacrylamide. The long heating time was allowed primarily to insure the gelation reaction to proceed to completion.

The final product at room temperature was a good photographic image in a tough flexible desensitized film firmly adherent to a tough flexible substrate. The composite film could be bent and twisted without permanently distorting or affecting the photographic image.

As illustrated herein, it will be recognized that suitable photopolymerizable compositions of the above character can be modified in the critical control of pH, as herein described, and after initiating photopolymerization, stopping it by raising the temperature above that of initiating polymerization, as provided herein.

As will be apparent from the foregoing description and examples, there is disclosed a controlled method and means for rapidly fixing, inactivating and desensitizing photosensitive compositions containing a polymerizable monomer and a photo-redox catalyst system which includes (1) a photo-oxidant system capable of being raised to a photoactive level by absorption of light in the 3800 A. to 7200 A. region and capable, at this photoactive level, of reacting with (2) a latent catalyst selected from the organic sulfinic group and from the triorgano-substituted phosphines, as herein described, to produce a polymerization initiating free radical. It is thereby shown that rapid fixing, inactivation and desensitization of partially polymerized photosensitive compositions can be accomplished by the combination of reducing the pH of, and heating, the photosensitive compositions.

pH reduction is accomplished by the positive control or addition, prior to image forming exposure, of pH lowering reagents to the photosensitive composition in combination with heating. This step elimates the need to otherwise handle the photosensitive composition after a photopolymer image has been formed and provide a permanent fixation or replica available in a few moments after initiation. Additionally, the addition of the pH lowering agent does not interfere with the rate of photopolymer production during the image forming step. As further disclosed, latent pH lowering reagents may be used to impart the required acidity to the photosensitive composition when required, thereby providing a photosensitive composition having a relatively long shelf life. Thereby is obtained a positive method of fixation control of addition polymerizable ethylenically unsaturated compounds capable of forming high polymer structure by photo-initiated addition polymerization in the presence of a light-activated catalyst system which is a latent catalyst system or an addition polymerization initiator which is activable by actinic radiation, that is, a catalyst system which is inactive in the dark and requires an exposure to actinic radiation to initiate polymerization throughout the body of the polymerizable material.

Having described the present embodiment of our improvement in the art in accordance with the patent statutes and exemplified by certain illustrations thereof, it will be apparent that some modifications and variations may be made without departing from the spirit and scope thereof. The specific examples are given by way of illustrating the improvements herein provided and we desire to have it understood that changes may be made within the scope of the following claims without departing from the spirit of the invention and improvement provided herein.

What is claimed is:

1. A process for polymerizing a vinyl monomer in a photosensitive composition, which includes the steps of:
   irradiating a photosensitive composition containing a mixture comprising
   (a) a polymerizable vinyl monomer,
   (b) a photo-oxidant dye inactive in the absence of visible light but capable of being raised to a photoactive level when irradiated with light having wavelengths lying between about 3800 A. and about 7200 A., and
   (c) a catalyst selected from the group consisting of an an organic sulfinic compound and a triorgano substituted phosphine capable of reacting with said photoactive level of said photo-oxidant to produce a radical sufficient to initiate polymerization of said vinyl monomer,
   with an imaging light pattern having wavelengths lying in the region between about 3800 A. to about 7200 A.; and
   heating said irradiated photosensitive composition to fix and desensitize said composition to further irradiation with light having wavelengths lying between about 3800 A. and about 7200 A., the pH of said photosensitive composition during at least a portion of said heating being below about a pH of 7.

2. The process of claim 1 wherein said organic sulfinic compound is selected from the group consisting of an organic sulfinic acid, a sulfinyl halide, a sulfinamide, an inorganic salt of an organic sulfinic acid, an organic ester derivative of an organic sulfinic acid, and an adduct derived from the combination of an organic sulfinic acid with a carbonyl compound.

3. The process of claim 1 wherein said organic sulfinic compound is present in concentrations of at least about $1 \times 10^{-6}$ moles per liter of said photosensitive composition.

4. The process of claim 1 wherein said triorgano substituted phosphine is selected from the group consisting of trialkylphosphine, triarylphosphine, dialkylarylphosphine and alkyldiarylphosphine.

5. The process of claim 1 wherein said triorgano substituted phosphine is present in concentrations of at least about $1 \times 10^{-6}$ moles per liter of said photosensitive composition.

6. The process of claim 1 wherein said photo-oxidant is selected from the group consisting of phenothiazine dyes, phenazine dyes, acridine dyes, xanthene dyes, phenoxazine dyes and pyronine dyes.

7. The process of claim 1 wherein said photo-oxidant is present in a concentration of at least about $10^{-7}$ moles per liter of said photosensitive composition.

8. The process of claim 1 wherein said vinyl monomer is selected from the group consisting of: vinylidene chloride, vinyl methyl ether, vinyl butyl ether, vinyl butyrate, styrene, vinyl acetate, vinyl benzoate, methyl methacrylate, vinylpyrrolidone, acrylic acid, acrylonitrile, acrylamide, barium diacrylate, calcium diacrylate, strontium diacrylate, N,N'-methylenebisacrylamide methacrylic acid, ethylene glycol diacrylate, diethylene glycol diacrylate, triethylene glycol diacrylate, sodium acrylate and glyceryl triacrylate.

9. The process of claim 1 wherein the concentration of said vinyl monomer is above about $2.5 \times 10^{-3}$ moles per liter of said photosensitive composition.

10. The process of claim 1 wherein said photosensitive composition includes a cross-linking agent.

11. The process of claim 1 wherein said photosensitive composition includes a cross-linking agent selected from the group consisting of N,N'-alkylenebisacrylamides, methacrylic acid, secondary acrylamides, tertiary acrylamides, metal salts of acrylic acid and metal salts of methacrylic acid.

12. The process of claim 1 wherein said vinyl monomer has a functionality of at least 2.

13. The process of claim 1 wherein said photosensitive composition includes, in addition, thickeners to increase the viscosity of said photosensitive composition.

14. The process of claim 1 wherein said photosensitive composition contains a solvent for said vinyl monomer, said catalyst and said photo-oxidant.

15. The process of claim 14 wherein the solvent is selected from the group consisting of water, methanol, ethanol, 1 propanol, 2 propanol, glycerol, ethylene glycol and dioxane.

16. The process of claim 14 wherein during said heating of said photosensitive composition, the temperature thereof is raised to above about 40° C. but below the boiling point of said solvent.

17. The process of claim 1 wherein said photosensitive composition includes a latent pH lowering reagent dissociating therefrom an acid group to lower the pH of said photosensitive composition below about pH 7 upon the heating of said photosensitive composition.

18. The process of claim 17 wherein said latent pH lowering reagent is selected from the group consisting of a chlorohydrin capable of releasing HCl.

19. The process of claim 17 including storing of said photosensitive composition in the absence of light at or below room temperature and at a pH above about 7 before irradiating said photosensitive composition.

20. The process of claim 1 wherein said pH of said photosensitive composition initially lies below about 7 as irradiation commences.

21. The process of claim 1 wherein the pH of said photosensitive composition is maintained below a pH of 7 during the heating of said photosensitive composition.

22. The process of claim 1 including, in addition, the step of storing said photosensitive composition in the absence of light at a temperature below about room temperature and at a pH above about pH 7 prior to irradiation.

23. The process of claim 1 wherein said photosensitive composition is maintained at about room temperature during irradiation.

24. The process of claim 23 wherein, during said heating of said photosensitive composition, the temperature thereof is raised substantially above room temperature, but lies below the boiling point temperature of the lowest boiling component in said photosensitive composition, thereby to rapidly desensitize said photosensitive composition.

25. The process of claim 1 wherein the heating of said photosensitive composition commences during irradiation thereof.

26. The process of claim 1 wherein the heating of said photosensitive composition commences after irradiation thereof has been terminated.

27. A process for polymerizing a vinyl monomer in a photosensitive composition, which includes the steps of:
   irradiating a photosensitive composition containing a mixture comprising
   (a) polymerizable vinyl monomers,
   (b) a photo-oxidant dye inactive in the absence of visible light but capable of being raised to a photoactive level when irradiated with light having wavelengths lying between about 3800 A. and about 7200 A.,
(c) a catalyst selected from the group consisting of an organic sulfinic compound and a triorgano substituted phosphine capable of reacting with said photo-active level of said photo-oxidant to produce a radical sufficient to initiate polymerization of said vinyl monomer, and
(d) a pH lowering reagent, with an imaging light pattern having wavelengths lying in the region between about 3800 A. to about 7200 A.; and heating said photosensitive composition substantially above room temperature to activate said reagent and desensitize said composition to further irradiation with light having wavelengths lying between about 3800 A. and about 7200 A., the pH of said photosensitive composition during at least a portion of said heating being below about a pH of 7.

28. A process for formation of a polymer image in a vinyl monomer composition, which includes the steps of: irradiating a photopolymerization reaction medium comprising
(a) photopolymerizable vinyl monomers and relatively small amounts of each of
(b) a photo-oxidant inactive in the absence of visible light but capable of being raised to a photoactive level when irradiated with light having wavelengths lying between about 3800 A. and about 7200 A., and
(c) a catalyst selected from the group consisting of an organic sulfinic compound and a triorgano substituted phosphine capable of reacting with said photoactive level of said photo-oxidant to produce a radical sufficient to initiate polymerization of said vinyl monomer, with radiation in the pattern of the desired image, said radiation having wavelengths lying in the wavelength region between about 3800 A. and about 7200 A., said reaction medium being maintained at about room temperature at the commencement of irradiation; and heating said reaction medium at a temperature substantially above room temperature after a predetermined period of time of irradiation, to thereby substantially fix and desensitize said reaction medium to light having wavelengths between about 3800 A. and about 7200 A., said reaction medium having a pH less than about 7 at the commencement of said heating.

29. A process of formation of a photopolymer image from a vinyl monomer, which includes the steps of: irradiating a reaction medium comprising
(a) a vinyl monomer in amounts greater than about $2.5 \times 10^{-3}$ moles per liter of said reaction medium;
(b) an organic photo-oxidant capable of being raised to a photoactive level when irradiated with light having wavelengths lying between about 3800 A. and about 7200 A., said organic photo-oxidant initially present in said reaction medium in amounts greater than about $1 \times 10^{-7}$ moles per liter of said reaction medium; and
(c) a catalyst capable of releasing an electron to said photo-oxidant when at said photo-active level to produce free radicals capable of initiating polymerization of said vinyl monomer, said catalyst being selected from the group consisting of an organic sulfinic compound and a triorgano substituted phosphine and said catalyst being present in said reaction medium in amounts greater than about $1 \times 10^{-6}$ moles per liter of said reaction mixture, with imaging light having wavelengths lying in the region between about 3800 A. and about 7200 A. to thereby initiate polymerization in said reaction medium in the form of said image, said irradiation continuing for a given period of time sufficient to enable a polymer image of a predetermined density to be obtained; and heating said reaction medium at a temperature substantially above room temperature after said given period of time to thereby substantially desensitize said reaction medium to light having wavelengths between about 3800 A. and about 7200 A., said reaction medium having a pH less than about 7 during said heating.

30. The method of producing an image in a resin film comprising catalytically polymerizing a photopolymer image in a photopolymerizable vinyl monomer resin film composition containing a photo-polymerization effecting photo-redox catalyst system consisting of a photo-oxidant dye and organic sulfinic or triorgano phosphine catalyst, and fixing the image by desensitizing by heating the said catalyst system in situ in the film and retaining the image fixed in the resin film.

31. The product produced by the process of claim 30.

32. The method of claim 30 wherein the desensitizing of said catalyst system comprises heating said photo-polymer system after imaging photopolymerization thereof at a pH of about 7 or less.

References Cited

UNITED STATES PATENTS

| 2,835,577 | 5/1958 | Levy | 96—114 XR |
| 2,875,047 | 2/1959 | Oster | 96—115 XR |
| 2,989,455 | 6/1961 | Neugebauer et al. | 204—158 |
| 2,996,381 | 8/1961 | Oster et al. | 96—115 XR |
| 3,042,518 | 7/1962 | Wainer | 96—48 |
| 3,042,519 | 7/1962 | Wainer | 96—48 |
| 3,050,390 | 8/1962 | Levinos et al. | 96—35.1 |
| 3,097,096 | 7/1963 | Oster | 96—115 XR |
| 3,330,659 | 7/1967 | Wainer | 96—35.1 |
| 3,331,761 | 7/1967 | Mao | 204—159.23 |

OTHER REFERENCES

Oster, G.: "The Photochemistry of Dyes in Solution," 1953, Photographic Engineering, vol. 4, No. 3, pp. 173–178.

RONALD H. SMITH, Primary Examiner

U.S. Cl. X.R.

96—115; 204—159.23, 159.24

PO-1050
(5/69)

UNITED STATES PATENT OFFICE
CERTIFICATE OF CORRECTION

Patent No. 3,531,282          Dated September 29, 1970

Inventor(s) L. J. Miller et al

It is certified that error appears in the above-identified patent and that said Letters Patent are hereby corrected as shown below:

```
Col.  3, line 62, "mean" should be --means--.
Col.  7, line 44, "polymerizaable" should be --polymerizable--;
         line 45, after time, "of" should be --at--;
         line 74, "atfer" should be --after--.
Col. 10, line 5, "wherein" should be --whereas--;
         line 46, "polmerization" should be --polymerization--.
Col. 12, Table 3, between lines 27 and 28,
                  "52" should be --5.2--; and
                  "4.7" should be --3.7--.
Col. 13, line 63, "quanttiy" should be --quantity--.
Col. 14, Table 5, "5.01" should be --5.02--.
Col. 17, line 30, delete the first "an".
```

SIGNED AND SEALED

DEC 22 1970

(SEAL)
Attest:

Edward M. Fletcher, Jr.
Attesting Officer

WILLIAM E. SCHUYLER, JR.
Commissioner of Patents